(12) United States Patent
Shiraishi

(10) Patent No.: US 10,466,462 B2
(45) Date of Patent: Nov. 5, 2019

(54) PHASE-CONTRAST MICROSCOPE AND IMAGINE METHOD

(71) Applicant: FUJIFILM Corporation, Tokyo (JP)

(72) Inventor: Yasushi Shiraishi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 133 days.

(21) Appl. No.: 15/848,895

(22) Filed: Dec. 20, 2017

(65) Prior Publication Data

US 2018/0113294 A1   Apr. 26, 2018

Related U.S. Application Data

(63) Continuation of application No. PCT/JP2016/064028, filed on May 11, 2016.

(30) Foreign Application Priority Data

Jun. 30, 2015  (JP) ................................. 2015-130874

(51) Int. Cl.
*G02B 21/14* (2006.01)
*G03B 15/03* (2006.01)
(Continued)

(52) U.S. Cl.
CPC ............ *G02B 21/14* (2013.01); *G02B 7/28* (2013.01); *G02B 21/00* (2013.01); *G02B 21/0004* (2013.01); *G03B 15/03* (2013.01)

(58) Field of Classification Search
CPC .......... G02B 21/14; G02B 7/28; G02B 21/00; G02B 21/0004; G03B 15/03
(Continued)

(56) References Cited

U.S. PATENT DOCUMENTS

2017/0322405 A1* 11/2017 Matsubara ............... G02B 3/14
2019/0033569 A1*  1/2019 Shiraishi .................. G02B 3/14

FOREIGN PATENT DOCUMENTS

JP           8-5929 A     1/1996
JP      2002-365023 A    12/2002
(Continued)

OTHER PUBLICATIONS

Extended European Search Report, dated Jun. 15, 2018, for corresponding European Application No. 16817567.7.
(Continued)

*Primary Examiner* — Frank G Font
(74) *Attorney, Agent, or Firm* — Birch, Stewart, Kolasch & Birch, LLP

(57) ABSTRACT

A liquid surface in a culture vessel is irradiated with liquid-surface-measurement illumination light, and transmitted light that has passed through the liquid is detected by an imaging unit. A relative positional relationship between a focal plane of an image forming optical system and the culture vessel is changed, a detection signal for each position of the focal plane is obtained, and a liquid surface shape is estimated on the basis of the detection signal for each position of the focal plane. Then, on the basis of the estimated liquid surface shape, adjustment information for adjusting the optical characteristics of an adjustment optical system for adjusting refraction of light due to the liquid surface shape is acquired. After the optical characteristics of the adjustment optical system have been adjusted on the basis of the adjustment information, an image of a specimen is captured by irradiating the culture vessel with phase-contrast-measurement illumination light.

22 Claims, 8 Drawing Sheets

(51) Int. Cl.
*G02B 21/00* (2006.01)
*G02B 7/28* (2006.01)

(58) Field of Classification Search
USPC .......................................... 359/383, 385, 389
See application file for complete search history.

(56) References Cited

FOREIGN PATENT DOCUMENTS

| JP | 2006-91506 A | 4/2006 |
|---|---|---|
| JP | 2007-293267 A | 11/2007 |
| JP | 2009-92772 A | 4/2009 |
| JP | 2009-122356 A | 6/2009 |
| JP | 2010-271537 A | 12/2010 |
| JP | 2015-152647 A | 8/2015 |
| JP | 2015-152648 A | 8/2015 |
| JP | 2015-152649 A | 8/2015 |
| JP | 2015-152650 A | 8/2015 |

OTHER PUBLICATIONS

International Preliminary Report on Patentability and Written Opinion of the International Searching Authority (forms PCT/IB/373, PCT/ISA/237 and PCT/IB/326), dated Oct. 3, 2017, for corresponding International Application No. PCT/JP2016/054913, with an English translation of the Written Opinion.

International Search Report (form PCT/ISA/210), dated Aug. 16, 2016, for corresponding International Application No. PCT/JP2016/064028, with an English translation.

Japanese Office Action, dated Feb. 6, 2018, for corresponding Japanese Application No. 2015-130874, with an English machine translation.

* cited by examiner

PHASE-CONTRAST MICROSCOPE AND IMAGINE METHOD

CROSS-REFERENCE TO RELATED APPLICATIONS

This application is a Continuation of PCT International Application No. PCT/JP2016/64028, filed on May 11, 2016, which claims priority under 35 U.S.C. § 119(a) to Japanese Patent Application No. 2015-130874, filed on Jun. 30, 2015. Each of the above application(s) is hereby expressly incorporated by reference, in its entirety, into the present application.

BACKGROUND OF THE INVENTION

1. Field of the Invention

The present invention relates to a phase-contrast microscope that performs phase-contrast measurement of a specimen in a liquid and to an imaging method.

2. Description of the Related Art

In recent years, phase-contrast measurement has been started to be widely used as a method for observing transparent cultivated cells, such as stem cells, without staining the cells. Phase-contrast microscopes are used to perform such phase-contrast measurement.

In a general phase-contrast microscope, a specimen is irradiated with ring-shaped illumination light, and direct light and diffracted light that have passed through the specimen enter a phase plate. The direct light is attenuated by a ring portion of the phase plate, the diffracted light passes through a transparent portion of the phase plate, and an image with light and dark contrast can be captured by forming images of the direct light and the diffracted light.

For example, when observing cells in a culture liquid by using a phase-contrast microscope, a meniscus is formed on the liquid surface of the culture liquid due to the effect of surface tension of the culture liquid. The meniscus acts as a lens and shifts the optical axis of ring-shaped illumination light, thereby exerting an effect on direct light and refracted light that enter the phase plate and causing a problem in that a clear phase contrast image cannot be obtained.

Various methods have been proposed in order to suppress the effect of the meniscus of the culture liquid. For example, JP2010-271537A proposes detecting the shape of a ring-shaped phase film at a pupil position of an objective lens and the shape of ring-shaped illumination light formed by an optical element by using a pupil image detector, and controlling the shape of a ring-shaped opening of the optical element on the basis of the detected coordinate data.

JP2007-293267A proposes, in consideration of displacement of the optical axis of illumination light that occurs not due to the effect of a meniscus but due to a curve of a bottom surface of a culture vessel or an inclination of the culture vessel, detecting the displacement of the optical axis of illumination light, and moving a phase plate in accordance with the displacement of the optical axis.

JP2009-122356A proposes moving a slit plate or a phase plate in order to suppress the effect of a meniscus.

SUMMARY OF THE INVENTION

However, the shape of a meniscus, which is determined by the material of a culture vessel and the characteristics of a liquid contained in the culture vessel, may vary. In particular, when performing "time-lapse imaging", in which image-capturing is performed a plurality of times over time, the liquid level of the culture liquid in the culture vessel changes with time due to evaporation of the culture liquid, and therefore the shape of the meniscus also changes with time.

Accordingly, it is necessary to recognize the shape of a meniscus as accurately as possible and to adjust the optical system in accordance with the shape. However, JP2010-271537A, JP2007-293267A, and JP2009-122356A do not propose a method for accurately recognizing various shapes of the meniscus at all.

An object of the present invention, which has been devised to solve the above problem, is to provide a phase-contrast microscope and an imaging method that can accurately recognize the shape of a meniscus formed on a liquid surface of a liquid contained in a vessel and can remove the effect of refraction of illumination light due to the meniscus with high precision.

A phase-contrast microscope according to an aspect of the present invention includes a phase-contrast-measurement illumination-light irradiation unit that irradiates a vessel containing a liquid and a specimen with phase-contrast-measurement illumination light for phase-contrast measurement, an imaging unit that captures an image of the specimen irradiated with the phase-contrast-measurement illumination light, a liquid-surface-measurement illumination-light irradiation unit that irradiates a liquid surface of the liquid with liquid-surface-measurement illumination light for measuring a liquid surface shape of the liquid in the vessel, a transmitted light detection unit that detects transmitted light that has passed through the liquid surface of the liquid in the vessel due to irradiation with the liquid-surface-measurement illumination light, a focal plane changing unit that changes a relative positional relationship between a focal plane of an image forming optical system and the vessel, the image forming optical system focusing the transmitted light on a detection surface of the transmitted light detection unit, a liquid-surface-shape estimating unit that estimates the liquid surface shape of the liquid on the basis of a detection signal of the transmitted light for each relative position of the focal plane and the vessel, an adjustment optical system whose optical characteristics are adjustable and that adjusts refraction of the phase-contrast-measurement illumination light due to the liquid surface shape of the liquid in the vessel in accordance with the optical characteristics, and an adjustment information acquisition unit that acquires adjustment information for adjusting the optical characteristics of the adjustment optical system on the basis of the liquid surface shape estimated by the liquid-surface-shape estimating unit.

The phase-contrast microscope according to an aspect of the present invention may further include an adjustment-optical-system control unit that adjusts the optical characteristics of the adjustment optical system on the basis of the adjustment information acquired by the adjustment information acquisition unit.

In the phase-contrast microscope according to an aspect of the present invention, the focal plane changing unit may change the relative positional relationship between the focal plane and the vessel by moving an optical element included in the image forming optical system in an optical axis direction.

In the phase-contrast microscope according to an aspect of the present invention, the focal plane changing unit may change the relative positional relationship between the focal plane and the vessel by moving the vessel in an optical axis direction of the image forming optical system.

In the phase-contrast microscope according to an aspect of the present invention, the focal plane changing unit may change the relative positional relationship between the focal plane and the vessel by switching between a plurality of optical elements that are provided in the image forming optical system and that have different focal lengths.

In the phase-contrast microscope according to an aspect of the present invention, the liquid-surface-shape estimating unit may estimate the liquid surface shape on the basis of information about an irradiation position of the liquid-surface-measurement illumination light on the liquid surface of the liquid, information representing a preset curve of the liquid surface, and a detection signal of the transmitted light in a case where at least one point on the liquid surface of the liquid is irradiated with the liquid-surface-measurement illumination light.

In the phase-contrast microscope according to an aspect of the present invention, the liquid-surface-shape estimating unit may estimate the liquid surface shape on the basis of at least one of information about an irradiation position of the liquid-surface-measurement illumination light on the liquid surface of the liquid or information representing a preset curve of the liquid surface, and a detection signal of the transmitted light in a case where at least three points on the liquid surface of the liquid are irradiated with the liquid-surface-measurement illumination light.

In the phase-contrast microscope according to an aspect of the present invention, the liquid-surface-shape estimating unit may estimate the liquid surface shape on the basis of a detection signal of the transmitted light in a case where at least nine points on the liquid surface of the liquid are irradiated with the liquid-surface-measurement illumination light.

In the phase-contrast microscope according to an aspect of the present invention, the liquid-surface-shape estimating unit may estimate the liquid surface shape only once for each of circumferences at different distances from a center of gravity position of the liquid surface of the liquid.

In the phase-contrast microscope according to an aspect of the present invention, when the liquid-surface-measurement illumination-light irradiation unit irradiates a plurality of points on the liquid surface of the liquid with the liquid-surface-measurement illumination light, the liquid-surface-measurement illumination-light irradiation unit may irradiate the points with the liquid-surface-measurement illumination light having shape patterns that differ between the points.

In the phase-contrast microscope according to an aspect of the present invention, when the liquid-surface-measurement illumination-light irradiation unit irradiates a plurality of points on the liquid surface of the liquid with the liquid-surface-measurement illumination light, the liquid-surface-measurement illumination-light irradiation unit may irradiate the points with the liquid-surface-measurement illumination light at timings that differ between the points.

In the phase-contrast microscope according to an aspect of the present invention, when the liquid-surface-measurement illumination-light irradiation unit irradiates a plurality of points on the liquid surface of the liquid with the liquid-surface-measurement illumination light, the liquid-surface-measurement illumination-light irradiation unit may irradiate the points with the liquid-surface-measurement illumination light having wavelengths that differ between the points.

In the phase-contrast microscope according to an aspect of the present invention, the liquid-surface-shape estimating unit may estimate a liquid surface shape at a point on the liquid surface that is not irradiated with the liquid-surface-measurement illumination light by performing interpolation by using a result of estimating a liquid surface shape at a point on the liquid surface that is irradiated with the liquid-surface-measurement illumination light.

In the phase-contrast microscope according to an aspect of the present invention, the liquid-surface-shape estimating unit may store a result of estimating the liquid surface shape, and when the liquid-surface-shape estimating unit estimates a liquid surface shape of the liquid surface again at a later time after the estimation result has been stored by the liquid-surface-shape estimating unit, the liquid-surface-measurement illumination-light irradiation unit may reduce the number of irradiation points of the liquid-surface-measurement illumination light on the liquid surface compared with a case where the liquid surface shape is estimated at an earlier time before the estimation result is stored, and the liquid-surface-shape estimating unit may estimate a liquid surface shape at the later time on the basis of the result of estimating the liquid surface based on a detection signal of the transmitted light at the irradiation points that have been reduced in number and the stored result of estimating the liquid surface shape.

In the phase-contrast microscope according to an aspect of the present invention, the liquid-surface-measurement illumination-light irradiation unit may irradiate the liquid surface of the liquid with pattern light having a preset pattern as the liquid-surface-measurement illumination light.

In the phase-contrast microscope according to an aspect of the present invention, preferably, the pattern light has a grid pattern.

In the phase-contrast microscope according to an aspect of the present invention, preferably, the pattern light has a concentric pattern.

In the phase-contrast microscope according to an aspect of the present invention, images having different shapes may be formed at a plurality of preset positions on an image formed by the pattern light.

In the phase-contrast microscope according to an aspect of the present invention, images having different colors may be formed at a plurality of preset positions on an image formed by the pattern light.

In the phase-contrast microscope according to an aspect of the present invention, the adjustment information acquisition unit may calculate an optical path displacement of the phase-contrast-measurement illumination light due to the liquid surface shape of the liquid on the basis of the estimated liquid surface shape and may acquire adjustment information of the adjustment optical system on the basis of the calculated optical path displacement.

In the phase-contrast microscope according to an aspect of the present invention, the liquid-surface-shape estimating unit may estimate the liquid surface shape by calculating curved surface information and position information of the liquid surface.

An imaging method according to an aspect of the present invention includes irradiating a liquid surface of a liquid in a vessel containing the liquid and a specimen with liquid-surface-measurement illumination light for measuring a liquid surface shape of the liquid in the vessel, detecting transmitted light that has passed through the liquid surface of the liquid in the vessel due to irradiation with the liquid-surface-measurement illumination light by using a transmitted light detection unit, changing a relative positional relationship between a focal plane of an image forming optical system and the vessel, the image forming optical system focusing the transmitted light on a detection surface of the transmitted light detection unit, and acquiring a detection signal of the transmitted light for each relative position of the focal plane and the vessel, estimating the liquid surface shape of the liquid on the basis of the detection signal of the transmitted light for each relative position of the focal plane and the vessel, acquiring adjustment information for adjusting optical characteristics of an adjustment optical system that adjusts refraction of light due to the liquid surface shape on the basis of the estimated liquid surface shape, adjusting the optical characteristics of the adjustment optical system on the basis of the adjustment information, irradiating the vessel with phase-contrast-measurement illumination light for phase-contrast measurement after adjusting the optical characteristics of the adjustment optical system, and capturing an image of the specimen irradiated with the phase-contrast-measurement illumination light.

With the phase-contrast microscope according to an aspect of the present invention, the liquid surface of a liquid in a vessel, containing the liquid and a specimen, is irradiated with liquid-surface-measurement illumination light for measuring the liquid surface shape of the liquid in the vessel, and transmitted light that has passed through the liquid in the vessel due to irradiation with the liquid-surface-measurement illumination light is detected by the transmitted light detection unit. Moreover, the relative positional relationship between the focal plane of the image forming optical system and the vessel is changed and a detection signal of transmitted light for each relative position of the focal plane and the vessel is acquired, and the liquid surface shape of the liquid is estimated on the basis of the detection signal of transmitted light for each relative position of the focal plane and the vessel. Therefore, it is possible to accurately recognize the shape of a meniscus formed on the liquid surface of the liquid contained in the vessel.

Adjustment information for adjusting the optical characteristics of the adjustment optical system, which adjusts refraction of light due to liquid surface shape, is acquired on the basis of the estimated liquid surface shape; the optical characteristics of the adjustment optical system are adjusted on the basis of the adjustment information; the vessel is irradiated with phase-contrast-measurement illumination light; and an image of the specimen irradiated with the phase-contrast-measurement illumination light is captured. Therefore, it is possible to remove the effect of refraction of the phase-contrast-measurement illumination light due to the meniscus with high precision and to acquire a more appropriate phase contrast image.

DESCRIPTION OF THE PREFERRED EMBODIMENTS

Figure 1:
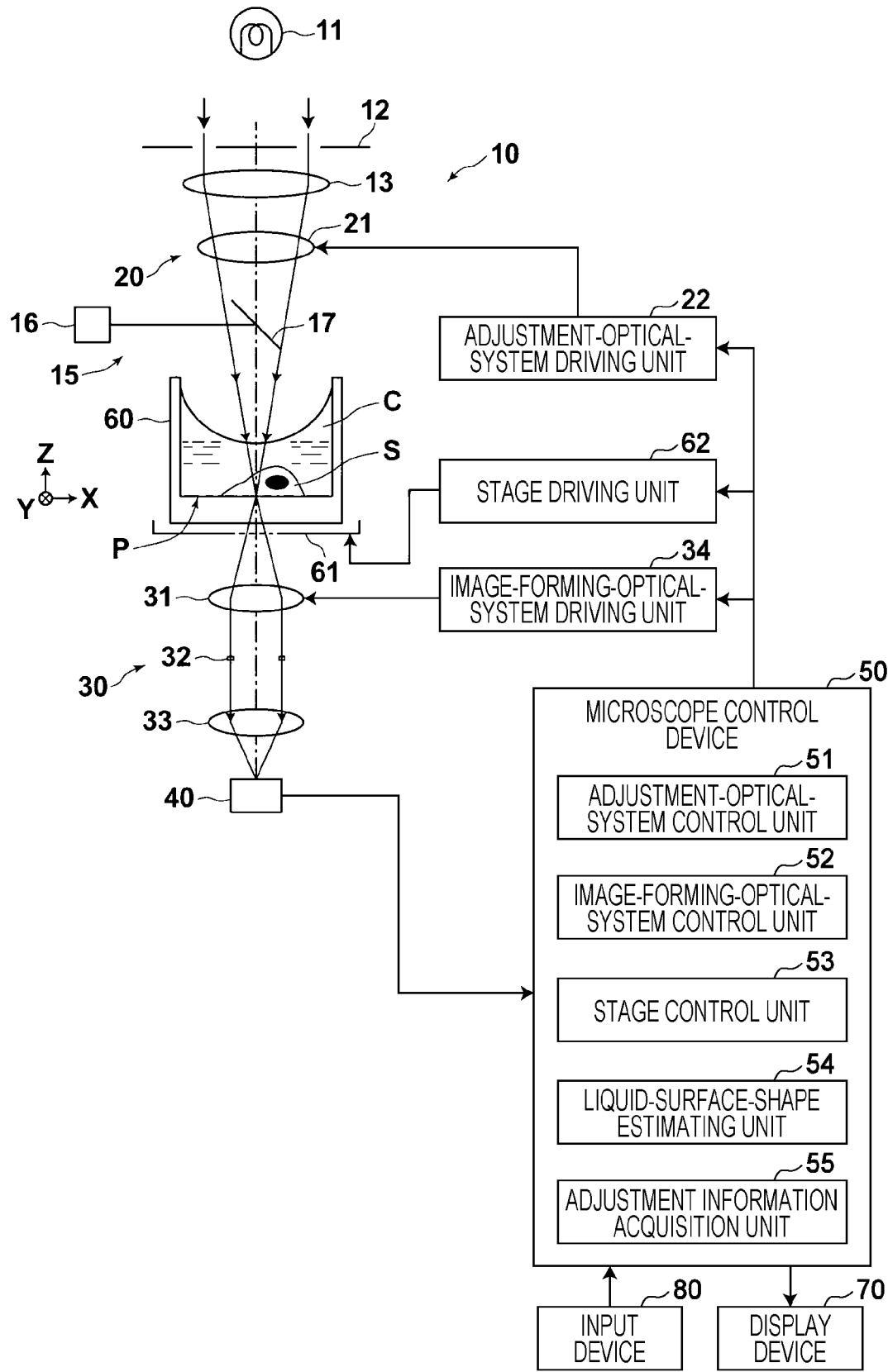
FIG. 1 schematically illustrates the structure of a microscope system using a phase-contrast microscope according to an embodiment of the present invention.

Hereinafter, a microscope system using a phase-contrast microscope and an imaging method according to an embodiment of the present invention will be described in detail with reference to the drawings. FIG. 1 schematically illustrates the structure of the microscope system according to present embodiment.

As illustrated in FIG. 1, the microscope system according to the present embodiment includes a phase-contrast-measurement illumination-light irradiation unit 10, a liquid-surface-measurement illumination-light irradiation unit 15, an adjustment optical system 20, an image forming optical system 30, an imaging unit 40, a microscope control device 50, a display device 70, and an input device 80.

In the microscope system according to the present embodiment, a stage 61 is disposed between the adjustment optical system 20 and the image forming optical system 30. A culture vessel 60, containing a culture liquid C and a specimen S, is placed on the stage 61. The microscope system according to the present embodiment includes a stage driving unit 62 that moves the stage 61 in the X direction, the Y direction, and the Z direction. The X direction and the Y direction are directions that are perpendicular to each other in a plane parallel to a specimen placement surface P. The Z direction is a direction that is perpendicular to the X direction and the Y direction.

In the microscope system according to the present embodiment, the phase-contrast-measurement illumination-light irradiation unit 10, the liquid-surface-measurement illumination-light irradiation unit 15, the adjustment optical system 20, the image forming optical system 30, the imaging unit 40, the stage 61, and the stage driving unit 62 constitute a phase-contrast microscope body; and the microscope control device 50 controls the phase-contrast microscope body. Hereinafter, specific structures of the phase-contrast microscope body will be described.

The phase-contrast-measurement illumination-light irradiation unit 10 irradiates the specimen S contained in the culture vessel 60 with illumination light for so-called phase-contrast measurement. In the present embodiment, the phase-contrast-measurement illumination-light irradiation unit 10 irradiates the specimen S with ring-shaped illumination light as the phase-contrast-measurement illumination light. To be specific, the phase-contrast-measurement illumination-light irradiation unit 10 according to the present embodiment includes a white light source 11 that emits white light, a slit plate 12 that has a ring-shaped slit on which the white light emitted from the white light source 11 is incident and that emits ring-shaped illumination light, and a condenser lens 13 on which ring-shaped illumination light emitted from the slit plate 12 is incident and that irradiates the specimen S with the incident ring-shaped illumination light.

Figure 2:
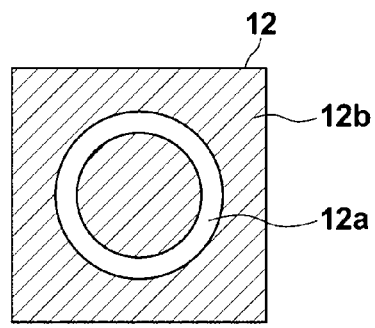
FIG. 2 illustrates an example of the structure of a slit plate.

FIG. 2 illustrates specific structures of the slit plate 12. As illustrated in FIG. 2, the slit plate 12 is a light screen 12b having a ring-shaped slit 12a. The light screen 12b blocks white light emitted from the white light source 11, while the slit 12a transmits white light. As the white light passes through the slit 12a, ring-shaped illumination light is formed.

In the present embodiment, ring-shaped illumination light is formed by using the slit plate 12 as described above. However, a method of forming ring-shaped illumination light is not limited to this. For example, ring-shaped illumination light may be formed by using a spatial light modulation element.

In the present embodiment, ring-shaped illumination light is used as phase-contrast-measurement illumination light. However, illumination light having a shape other than a ring shape, such as a triangular shape or a quadrangular shape, may be used, as long as the shape is conjugate to a phase plate described below.

The bottom surface of the culture vessel 60, which is placed on the stage 61, is the specimen placement surface P. The specimen S, such as a group of cells, is placed on the specimen placement surface P. The culture vessel 60 is filled with the culture liquid C, and a concave meniscus is formed on the liquid surface of the culture liquid C. Examples of the culture vessel 60 include a petri dish and a well plate in which a plurality of wells are arranged. When a well plate is used as the culture vessel 60, the specimen S and the culture liquid C are contained in each well, and a meniscus is formed in each well.

In the present embodiment, the specimen S is a group of cells cultured in the culture liquid. However, the specimen S is not limited to a specimen that is being cultured. The specimen S may be a cell fixed in a liquid, such as water, formalin, ethanol, or methanol. Also in this case, a meniscus is formed on the liquid surface of such a liquid in the vessel.

The adjustment optical system 20 adjusts refraction of phase-contrast-measurement illumination light due to the liquid surface shape of the meniscus. The adjustment optical system 20 according to the present embodiment includes an adjustment optical element 21 and an adjustment-optical-system driving unit 22.

The adjustment optical element 21 has optical power. To be specific, a liquid crystal lens whose optical power changes due to application of a voltage, a liquid lens whose radius of curvature can be changed, a spatial light modulator whose focal length can be changed, or the like can be used as the adjustment optical element 21. When using a lens as the adjustment optical element 21, a plano-convex lens whose incident surface or emission surface has a curvature may be used, or a conveco-convex lens whose incident surface and emission surface both have curvatures may be used.

The adjustment-optical-system driving unit 22 changes the optical power of the adjustment optical element 21 and adjusts the focal length on the basis of a control signal output from an adjustment-optical-system control unit 51 described below. To be specific, when a liquid crystal lens or a spatial light modulator is used as the adjustment optical element 21, the adjustment-optical-system driving unit 22 applies a voltage to the liquid crystal lens or the spatial light modulator in accordance with a desired focal length. When a liquid lens is used as the adjustment optical element 21, the adjustment-optical-system driving unit 22 adjusts the amount of liquid in the liquid lens in accordance with a desired focal length, and thereby adjusts the radius of curvature of the liquid lens.

Figure 3:
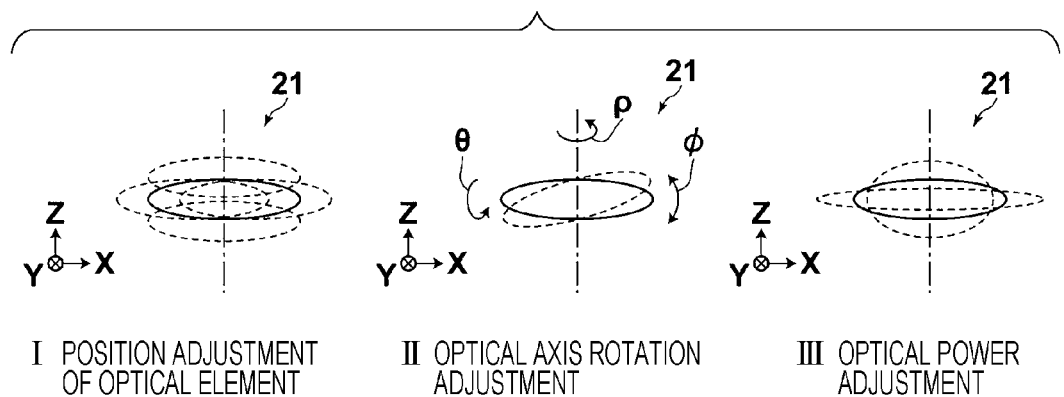
FIG. 3 schematically illustrates adjustments of the position, rotation of the optical axis, and the optical power of an adjustment optical system.

The adjustment-optical-system driving unit 22 includes a mechanism that adjusts the position of the adjustment optical element 21 and the optical axis direction of the adjustment optical element 21 on the basis of a control signal output from the adjustment-optical-system control unit 51. To be specific, the adjustment-optical-system driving unit 22 includes a mechanism that can change the position of the adjustment optical element 21 in the X direction, the Y direction, and the Z direction. The adjustment-optical-system driving unit 22 includes a mechanism that rotates the optical axis of the adjustment optical element 21. Part I in FIG. 3 schematically illustrates changes in the position of the adjustment optical element 21 in the X direction, the Y direction, and the Z direction. Part II in FIG. 3 schematically illustrates rotation adjustments of the optical axis of the adjustment optical element 21 around the X axis ($\theta$), around the Y axis ($\phi$), and around the Z axis ($\rho$). Part III in FIG. 3 schematically illustrates adjustment of the optical power of the adjustment optical element 21. In part III in FIG. 3, an example in which the optical power is adjusted by adjusting the radius of curvature of the adjustment optical element 21 is shown. However, a method of adjusting the optical power is not limited to this. For example, when a liquid crystal lens or a spatial light modulator is used as the adjustment optical element 21, the optical power may be adjusted by adjusting an applied voltage.

In the present embodiment, the adjustment optical element 21 is moved in the X direction, the Y direction, and the Z direction. However, as long as an optical effect equivalent to that of moving the adjustment optical element 21 can be obtained, it is not necessary to move the adjustment optical element 21. For example, when a liquid crystal lens or a spatial light modulator is used as the adjustment optical element 21, an operational effect similar to that of shifting the optical axis due to movement of the adjustment optical element 21 may be obtained by adjusting an applied voltage. Also regarding the optical axis direction of the adjustment optical element 21, it is not necessary to rotate the adjustment optical element 21 itself. An operational effect similar to that of rotating the optical axis due to rotation of the adjustment optical element 21 may be obtained by adjusting an applied voltage.

In the present embodiment, the adjustment optical element 21 is moved in the X direction and the Y direction. However, this is not a limitation. By moving the stage 61 in the X direction and the Y direction, the relative positional relationship between the adjustment optical element 21 and a meniscus formed in the culture vessel 60 in the X direction and the Y direction may be changed.

In the present embodiment, one adjustment optical element 21 is used. However, the optical power may be adjusted by switching between a plurality of adjustment optical elements 21 having different focal lengths. In this case, switching between the adjustment optical elements 21 may be performed automatically or manually. In the case where switching between the plurality of adjustment optical elements 21 is performed manually, for example, information about the type of an appropriate adjustment optical element 21 may be displayed on the display device 70 on the basis of a liquid surface shape estimated by a liquid-surface-shape estimating unit 54 described below, and a user may manually switch between the adjustment optical elements 21 on the basis of the display.

Figure 4:
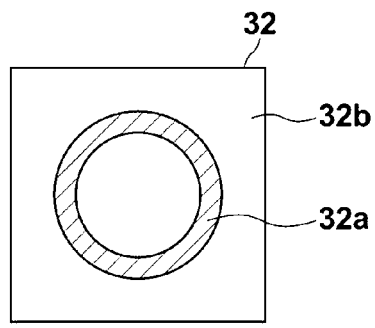
FIG. 4 illustrates an example of the structure of a phase plate.

The image forming optical system 30 includes an objective lens 31, a phase plate 32, an image forming lens 33, and an image-forming-optical-system driving unit 34. FIG. 4 is a plan view illustrating specific structures of the phase plate 32. As illustrated in FIG. 4, the phase plate 32 includes a transparent plate 32b, which is transparent to the wavelength of ring-shaped illumination light, and a phase ring 32a formed on the transparent plate 32b. The size of the slit 12a described above has a conjugate relationship with the phase ring 32a.

The phase ring 32a includes a phase film that shifts the phase of incident light by a quarter wavelength and a light attenuation filter that reduces the intensity of incident light, which are formed in a ring shape. When direct light incident on the phase plate 32 passes through the phase ring 32a, the phase of the direct light is shifted by a quarter wavelength and the brightness of the direct light is reduced. On the other hand, most part of diffracted light diffracted by the specimen S passes through the transparent plate 32b of the phase plate 32, and the phase and the brightness of the diffracted light do not change.

The objective lens 31 is moved by the image-forming-optical-system driving unit 34 in the Z direction. When capturing a phase contrast image of the specimen S, autofocus control is performed by moving the objective lens 31 in the Z direction by using the image-forming-optical-system driving unit 34, and the contrast of an image captured by the imaging unit 40 is adjusted.

When estimating the liquid surface shape of the culture liquid C in the culture vessel 60 described below, the position of the focal plane of the image forming optical system 30 is changed by moving the objective lens 31 in the Z direction (optical axis direction of the objective lens 31) by using the image-forming-optical-system driving unit 34. That is, the relative positional relationship between the focal plane of the image forming optical system 30 and the culture vessel 60 is changed. The change in the position of the focal plane of the image forming optical system 30 when estimating the liquid surface shape will be described below in detail. In the present embodiment, the image-forming-optical-system driving unit 34 corresponds to a focal plane changing unit in the present invention.

Direct light and diffracted light that have passed through the phase plate 32 enter the image forming lens 33, and the image forming lens 33 forms images of the direct light and the diffracted light on the imaging unit 40. In the present embodiment, the objective lens 31, which is included in the image forming optical system 30, is moved in the Z direction as described above. However, the focal plane of the image forming optical system 30 may be changed by moving the image forming lens 33 in the Z direction.

The image-forming-optical-system driving unit 34 includes a mechanism that moves the objective lens 31 in the Z direction as described above.

The imaging unit 40 includes an imaging element that captures a phase contrast image of the specimen S formed by the image forming lens 33. As the imaging element, a charge-coupled device (CCD) image sensor, a complementary metal-oxide semiconductor (CMOS) image sensor, or the like may be used.

The liquid-surface-measurement illumination-light irradiation unit 15 includes a laser light source 16 and a dichroic mirror 17. The laser light source 16 emits laser light toward the dichroic mirror 17, which is disposed between the adjustment optical element 21 of the adjustment optical system 20 and the culture vessel 60. The laser light is liquid-surface-measurement illumination light for measuring the liquid surface shape of the culture liquid C in the culture vessel 60. The wavelength of the laser light differs from the wavelength of phase-contrast-measurement illumination light.

The dichroic mirror 17 has optical characteristics that reflect laser light emitted from the laser light source 16 toward the liquid surface of the culture liquid C and that transmit phase-contrast-measurement illumination light. It is not necessary to use a dichroic mirror that transmits the phase-contrast-measurement illumination light. A simple mirror that reflects the laser light emitted from the laser light source 16 may be used. In this case, when performing phase-contrast measurement, the mirror may be retracted from the light path of the phase-contrast-measurement illumination light.

The laser light emitted from the laser light source 16 of the liquid-surface-measurement illumination-light irradiation unit 15 is reflected by the dichroic mirror 17, passes through the culture liquid C in the culture vessel 60, passes through the image forming optical system 30, and is detected by the imaging unit 40. A detection signal of transmitted light detected by the imaging unit 40 is output to the liquid-surface-shape estimating unit 54 of the microscope control device 50 described below. In the present embodiment, the imaging unit 40 corresponds to a transmitted light detection unit in the present invention. That is, in the present embodiment, the imaging unit 40 for capturing an image of the specimen S is also used as a transmitted light detection unit for detecting liquid-surface-measurement illumination light. However, this structure is not a limitation. A transmitted light detection unit independent of the imaging unit 40 may be used. To be specific, a dichroic mirror, which is disposed between the phase plate 32 and the image forming lens 33 and that transmits phase-contrast-measurement illumination light and reflects liquid-surface-measurement illumination light, and an imaging element, which detects the liquid-surface-measurement illumination light reflected by the dichroic mirror, may be used an independent transmitted light detection unit.

In the present embodiment, a plurality of irradiation points on the liquid surface of the culture liquid C are irradiated with the laser light, which is liquid surface shape measurement illumination light. In the present embodiment, by moving the stage 61 in the X direction and the Y direction as described below, the inside of the culture vessel 60 (for example, a well) is scanned with the phase-contrast-measurement illumination light and phase contrast images of a plurality of imaging regions, into which one well is divided, are captured. In the present embodiment, at least nine irradiation points in each imaging region are irradiated with the laser light. The nine irradiation points are arranged in three rows and three columns at preset distances. Preferably, the nine irradiation points are arranged so as to be uniformly distributed in the imaging region.

Figure 5:
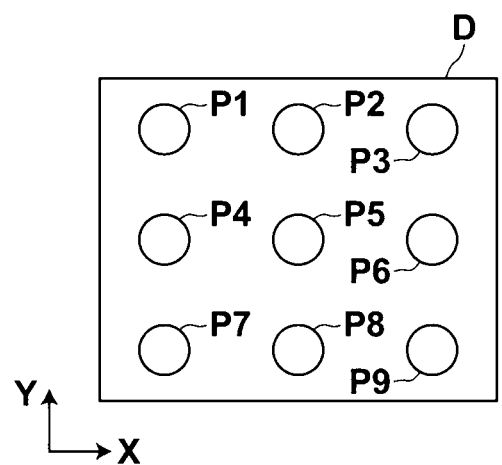
FIG. 5 illustrates the positions of images P1 to P9 of laser light that are formed on a detection surface of an imaging unit and that correspond to irradiation points, when it is assumed that a meniscus is not formed.
Figure 6:
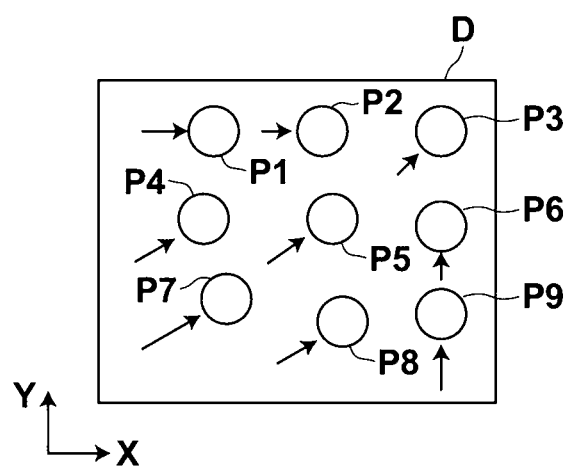
FIG. 6 illustrates the positions of images P1 to P9 of laser light that are formed on the detection surface of the imaging unit and that correspond to the irradiation points, when it is assumed that a meniscus is formed.

FIG. 5 illustrates the positions of images P1 to P9 of laser light that are formed on the detection surface D of the imaging unit 40 and that correspond to the irradiation points, for example, when it is assumed that a meniscus is not formed on the liquid surface of the culture liquid C. FIG. 6 illustrates the positions of images P1 to P9 of laser light that are formed on the detection surface D of the imaging unit 40 and that correspond to the irradiation points, when it is assumed that a meniscus is formed on the liquid surface of the culture liquid C. As illustrated in FIG. 6, laser light is refracted at the liquid surface of the culture liquid C due to the shape of a meniscus formed on the liquid surface of the culture liquid C, and thereby the positional relationships among the positions of the images P1 to P9 of the laser light that are formed on the detection surface D and that correspond to the irradiation points are displaced from the positional relationships shown in FIG. 5 in the directions of arrows.

In the present embodiment, the irradiation points shown in FIG. 5 are successively irradiated with laser light by moving the stage 61 in the X direction and the Y direction by using the stage driving unit 62. That is, the irradiation points are irradiated with the laser light at different timings. However, this is not a limitation. For example, the irradiation points shown in FIG. 5 may be successively irradiated with laser light by moving the positions of the laser light source 16 and the dichroic mirror 17 in the X direction and the Y direction. In the present embodiment, nine irradiation points arranged in three rows and three columns are irradiated with laser light. However, the number of irradiation points is not limited to this. The number of irradiation point may be sixteen (four rows and four columns) or twenty five (five rows and five columns).

The number of irradiation points irradiated with laser light may be changed in accordance with the size of the imaging region or the size of the liquid surface of the culture liquid C. For example, the number of irradiation points may be automatically changed on the basis of information about the size of the imaging region or information about the size or the type of the culture vessel 60. For example, a user may input and set the information about the size of the imaging region or the information about the type of the culture vessel 60 by using the input device 80.

The microscope control device 50 is a computer including a central processing unit (CPU) and a storage device.

To be specific, as illustrated in FIG. 1, the microscope control device 50 includes the adjustment-optical-system control unit 51 that controls the adjustment-optical-system driving unit 22, an image-forming-optical-system control unit 52 that controls the image-forming-optical-system driving unit 34, a stage control unit 53 that controls the stage driving unit 62, the liquid-surface-shape estimating unit 54, and an adjustment information acquisition unit 55. The liquid-surface-shape estimating unit 54 estimates the liquid surface shape of the culture liquid C in the culture vessel 60 on the basis of a detection signal of transmitted light detected by the imaging unit 40 due to irradiation with laser light that is the liquid surface shape measurement illumination light. The adjustment information acquisition unit 55 acquires adjustment information for adjusting the optical characteristics of the adjustment optical system 20 on the basis of the liquid surface shape estimated by the liquid-surface-shape estimating unit 54.

Here, estimation of a liquid surface shape, which is performed by the liquid-surface-shape estimating unit 54 according to the present embodiment, will be described in detail.

In the present embodiment, nine irradiation points in an imaging region on the liquid surface of the culture liquid C are irradiated with laser light that is liquid surface shape measurement illumination light as described above. At this time, the position of the focal plane of the image forming optical system 30 is changed for each irradiation point, the irradiation point is irradiated with the laser light each time the position of the focal plane is changed, and transmitted light for each irradiation point is detected by the imaging unit 40. The liquid-surface-shape estimating unit 54 calculates the liquid level of the culture liquid C at each irradiation point on the basis of a displacement amount of an image of transmitted light on the detection surface detected for each position of the focal plane, and estimates the liquid surface shape of the culture liquid C in the imaging region on the basis of information about the calculated liquid level. In the present embodiment, the irradiation points are irradiated with laser light at timings that differ between the points as described above. Therefore, it is possible to clearly recognize the correspondence between an imaging position of transmitted light before changing the position of the focal plane and an imaging position of transmitted light after changing the position of the focal plane.

Figure 7:
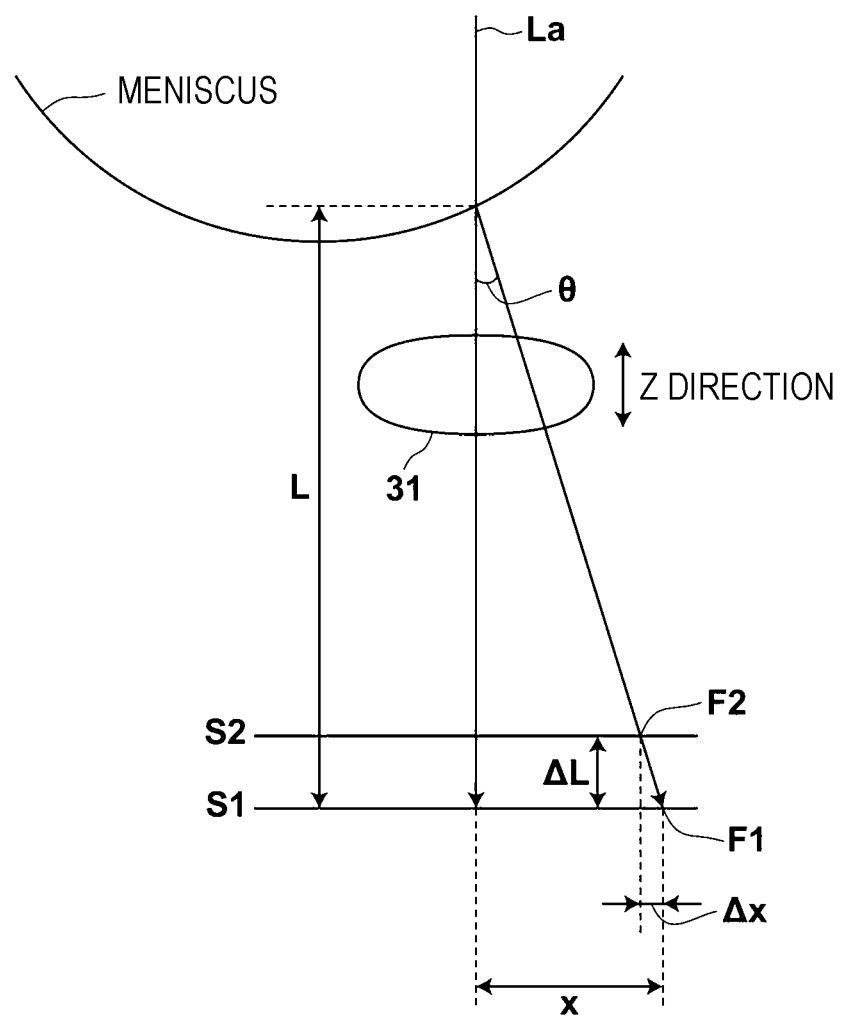
FIG. 7 illustrates a method of estimating a liquid surface shape.

To be specific, as illustrated in FIG. 7, in a case where the focal plane of the image forming optical system 30 including the objective lens 31 is set at the position of S1, when an arbitrary irradiation point is irradiated with laser light La, the light path of transmitted light is refracted by an angle $\theta$ because of an inclination of the liquid surface due to a meniscus, and the imaging position of transmitted light on the focal plane S1 becomes F1, which is displaced from the irradiation position by x.

Next, when the focal plane of the image forming optical system 30 is changed to the position of S2 by moving the objective lens 31 in the Z direction and the same irradiation point is irradiated with the laser light La, the light path of transmitted light is refracted similarly by the angle $\theta$ due to the inclination of the liquid surface. At this time, the imaging position of transmitted light on the focal plane S2 becomes F2, which is displaced from the imaging position F1 of transmitted light on the focal plane S1 by $\Delta x$. The displacement amount $\Delta x$ is detected by the imaging unit 40. That is, the displacement amount $\Delta x$ can be calculated on the basis of the imaging position of transmitted light on the detection surface of the imaging unit 40 in the case where the focal plane is set at S1 and irradiation with laser light is performed and the imaging position of transmitted light on the detection surface of the imaging unit 40 in the case where the focal plane is set at S2 and irradiation with laser light is performed. In the following description, it is assumed that the displacement amount $\Delta x$ is actually detected on the detection surface of the imaging unit 40. Here, to facilitate understanding, only a displacement amount in the X direction will be described. However, in practice, estimation of a liquid surface shape is performed also including a displacement amount in the Y direction.

Next, as illustrated in FIG. 7, when a change between the focal plane S1 and the focal plane S2 in the Z direction is denoted by $\Delta L$; x, $\Delta x$, L, and $\Delta L$ have a relationship represented by the following formulas, and the value of L can be calculated.

$$\Delta x/x = \Delta L/L$$

$$L = (\Delta L/\Delta x) \times x$$

L denotes the distance from the detection surface of the imaging unit 40 to the liquid surface of the culture liquid C and includes information about the liquid level of the culture liquid C. Therefore, by calculating the value of L for each irradiation point, it is possible to estimate the liquid surface shape of the culture liquid C in the imaging region. The value of L for a point other than the nine irradiation points may be calculated, for example, by performing interpolation and extrapolation on the basis of the values of L calculated for the nine irradiation points. Regarding interpolation, linear interpolation may be used. Alternatively, a function representing a curved surface of a meniscus may be set beforehand, and interpolation and extrapolation may be performed by performing fitting to the function. The function representing the curved surface of the meniscus may be also automatically changed on the basis of, for example, information about the size of the imaging region or information about the type of the culture vessel 60. For example, a user may set and input the information about the size or the type of the culture vessel 60 by using the input device 80.

The liquid-surface-shape estimating unit 54 estimates a liquid surface shape by calculating the position of a point on the liquid surface of the culture liquid C in the imaging region in the Z direction as described above, and outputs the estimation result to the adjustment information acquisition unit 55.

The adjustment information acquisition unit 55 acquires adjustment information for adjusting the optical characteristics of the adjustment optical system 20 on the basis of the liquid surface shape estimated by the liquid-surface-shape estimating unit 54 as described above. To be specific, the adjustment information acquisition unit 55 according to the present embodiment acquires the inclination angle of the liquid surface at at least one irradiation point in the imaging region on the basis of the liquid surface shape estimated by the liquid-surface-shape estimating unit 54, and calculates the refraction angle θ of light at the irradiation point in the imaging region on the basis of the inclination angle and the refractive index of the culture liquid C. Then, the adjustment information acquisition unit 55 outputs information about the refraction angle θ of light at the irradiation point in the imaging region to the adjustment-optical-system control unit 51 as adjustment information.

The adjustment-optical-system control unit 51 adjusts the optical characteristics of the adjustment optical system 20 on the basis of the information about the refraction angle θ of light at the irradiation point calculated by the adjustment information acquisition unit 55. To be specific, a look-up table of correspondence between the refraction angle θ at the irradiation point and an adjustment amount of the adjustment optical element 21 of the adjustment optical system 20 is preset in the adjustment-optical-system control unit 51. The adjustment-optical-system control unit 51 acquires the adjustment amount of the adjustment optical element 21 of the adjustment optical system 20 with reference to the look-up table on the basis of the input information about the refraction angle θ at the position of the irradiation point, and outputs a control signal in accordance with the adjustment amount to the adjustment-optical-system driving unit 22. Examples of the adjustment amount of the adjustment optical element 21 of the adjustment optical system 20 include, as described above, the position of the adjustment optical element 21 in the X direction, the Y direction, and the Z direction; the optical power of the adjustment optical element 21; and the optical axis direction of the adjustment optical element 21.

The control signal output from the adjustment-optical-system control unit 51 is input to the adjustment-optical-system driving unit 22. The adjustment-optical-system driving unit 22 adjusts the optical characteristics of the adjustment optical element 21 by adjusting the optical power, the position in the X direction, the Y direction, and the Z direction, and the optical axis direction of the adjustment optical element 21 on the basis of the input control signal.

When adjusting refraction due to a meniscus by switching between a plurality of adjustment optical elements 21, the adjustment information acquisition unit 55 acquires, as adjustment information, information specifying the type of an adjustment optical element 21 having optical characteristics that correspond to the liquid surface shape estimated by the liquid-surface-shape estimating unit 54. It is assumed that a table of correspondence between a liquid surface shape and information specifying the type of an adjustment optical element 21 that corresponds to the liquid surface shape is preset in the adjustment information acquisition unit 55.

The information specifying the type of the adjustment optical element 21, which is acquired by the adjustment information acquisition unit 55, is output to the adjustment-optical-system control unit 51. The adjustment-optical-system control unit 51 automatically switches to an adjustment optical element 21 that corresponds to the liquid surface shape on the basis of the input information. Alternatively, the information specifying the type of the adjustment optical element 21 may be displayed on the display device 70 to inform a user about the information, and the user may manually switch between the adjustment optical elements 21.

The image-forming-optical-system control unit 52 controls driving of the image-forming-optical-system driving unit 34 to move the objective lens 31 in the Z direction. To be specific, when capturing a phase contrast image of the specimen S as described above, the image-forming-optical-system control unit 52 according to the present embodiment performs autofocus control by moving the objective lens 31 in the Z direction by using the image-forming-optical-system driving unit 34.

When estimating the liquid surface shape of the culture liquid C in the culture vessel 60, the image-forming-optical-system control unit 52 changes the relative positional relationship between the focal plane of the image forming optical system 30 and the culture vessel 60 by moving the objective lens 31 in the Z direction by using the image-forming-optical-system driving unit 34.

Referring to FIG. 7, a movement amount ΔL of the objective lens 31 in the Z direction when estimating the liquid surface shape of the culture liquid C will be described. When the maximum height of the liquid surface of the culture liquid C is denoted by $L_{max}$ and the resolution of the imaging element of the imaging unit 40 is denoted by $\Delta x_{min}$, the movement amount ΔL of the objective lens 31 in the Z direction that is necessary to detect a displacement of a light path due to a meniscus can be obtained by using the following formulas. Here, $\theta_{max}$ denotes the permissible limit of the angle between L and x when the light path is displaced by x, which is determined by the performance of the adjustment optical element 21.

$$x = L_{max} \times \tan \theta_{max}$$

$$\Delta L = L_{max} x (\Delta x_{min}/x) = \Delta x_{min}/\tan \theta_{max}$$

The stage control unit 53 moves the stage 61 in the X direction, the Y direction, and the Z direction by controlling driving of the stage driving unit 62. The stage control unit 53 enables capturing of phase contrast images of a plurality of imaging regions, into which one well is divided, by scanning the inside of one well with phase-contrast-measurement illumination light by moving the stage 61 in the X direction and the Y direction as described above.

The input device 80 and the display device 70 are connected to the microscope control device 50. The input device 80 includes input devices, such as a keyboard and a mouse, and accepts setting input by a user. In particular, the input device 80 according to the present embodiment accepts setting input of various types of information about the size or the type of the culture vessel 60 as described above.

The display device 70, which is a display device such as a liquid crystal display, displays a phase contrast image captured by the imaging unit 40 and the like. The display device 70 may be a touch panel that can accept setting input when the screen thereof is pressed, and the display device 70 may also serve as an input device.

Figure 8:
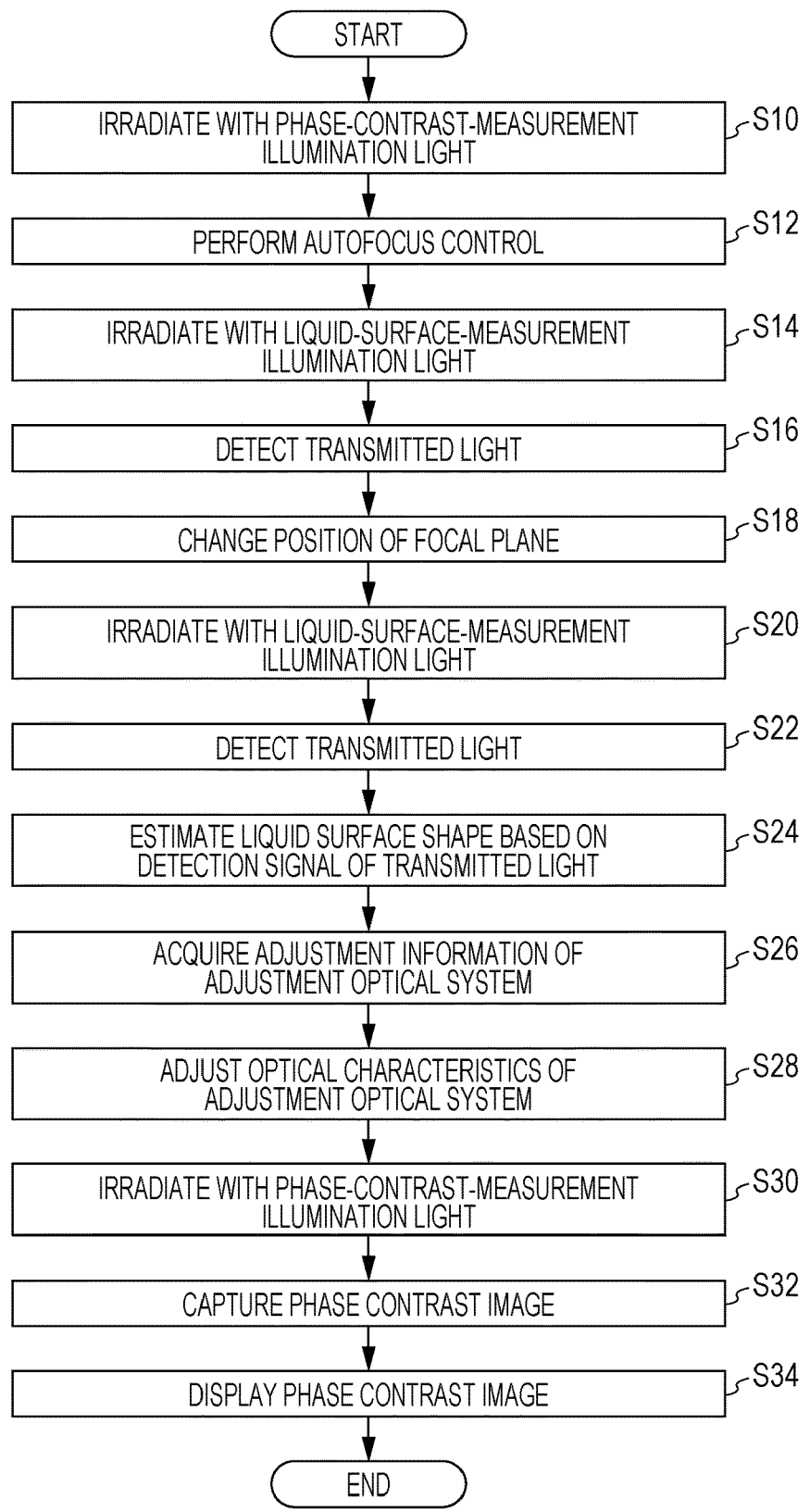
FIG. 8 is a flowchart for describing the operation of the microscope system using the phase-contrast microscope according to the embodiment of the present invention.

Next, referring to the flowchart of FIG. 8, an operation of the microscope system according to according to the present embodiment will be described.

First, the culture vessel 60, which contains the specimen S and the culture liquid C, is placed on the stage 61. Then, the stage 61 is moved by the stage driving unit 62 to a position where the first one of a plurality of imaging regions (for example, an imaging region R shown in FIG. 9) in a well is to be irradiated with phase-contrast-measurement illumination light, and the imaging region is irradiated with the phase-contrast-measurement illumination light (S10). Due to irradiation of the phase-contrast-measurement illumination light, a phase contrast image of the first imaging region is captured by the imaging unit 40. The phase contrast image is input to the image-forming-optical-system control unit 52, and the image-forming-optical-system control unit 52 performs autofocus control so that the contrast of the input phase contrast image becomes the maximum (S12).

Next, after the autofocus control has been performed, the stage 61 moves to a position where the first irradiation point (for example, an irradiation point P1 shown in FIG. 9), which is one of the nine irradiation points of liquid-surface-measurement illumination light in the imaging region, is to be irradiated with liquid-surface-measurement illumination light, and the liquid surface of the culture liquid C is irradiated with laser light as the liquid-surface-measurement illumination light (S14). Then, transmitted light that has passed through the culture liquid C and the image forming optical system 30 is detected by the imaging unit 40, and information about the imaging position of the image of the transmitted light is acquired on the basis of the detection signal (S16).

Next, as the objective lens 31 is moved by the image-forming-optical-system driving unit 34 in the Z direction, the relative positional relationship between the focal plane of the image forming optical system 30 and the culture vessel 60 is changed (S18), and the liquid surface of the culture liquid C is irradiated again with laser light as liquid-surface-measurement illumination light (S20). Then, transmitted light that has passed through the culture liquid C and the image forming optical system 30 is detected again by the imaging unit 40, and information about the imaging position of the image of the transmitted light is acquired on the basis of the detection signal (S22).

Information about the imaging position of transmitted light before changing the position of the focal plane and information about the imaging position of transmitted light after changing the position of the focal plane are acquired by the liquid-surface-shape estimating unit 54, a displacement amount of the imaging position is calculated, and the information L about the liquid level of the culture liquid C is calculated by using the aforementioned formulas on the basis of the displacement amount.

Figure 9:
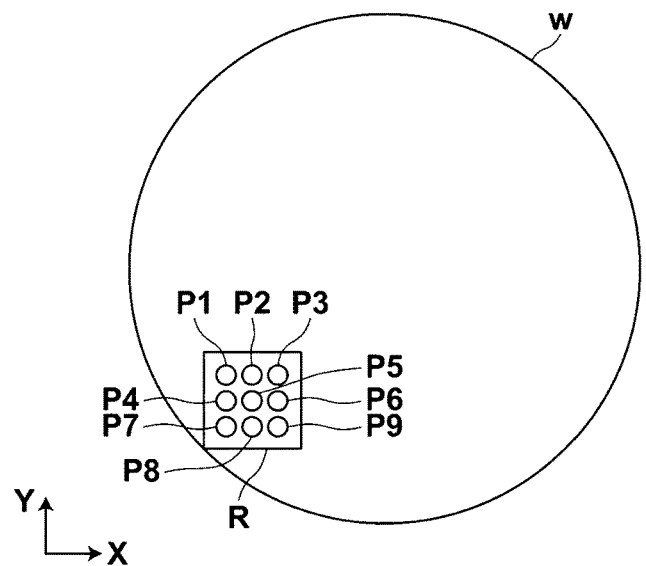
FIG. 9 illustrates a case where a liquid surface shape is estimated by irradiating nine irradiation points in an imaging region with liquid-surface-measurement illumination light.

Next, the processing from steps S14 to S22 is performed similarly on the remaining eight irradiation points (irradiation points P2 to P9 shown in FIG. 9). For each irradiation points, a displacement amount of the imaging position of transmitted light is calculated, and information L about the liquid level of the culture liquid C is calculated on the basis of the displacement amount. Then, the liquid-surface-shape estimating unit 54 estimates the liquid surface shape of the culture liquid C in the first imaging region on the basis of the information L about the liquid level of the culture liquid C corresponding to each of the irradiation points acquired as described above (S24).

The result of estimating the liquid surface shape is output to the adjustment information acquisition unit 55. The adjustment information acquisition unit 55 acquires adjustment information for adjusting the optical characteristics of the adjustment optical system 20 on the basis of the estimated liquid surface (S26). The adjustment information acquired by the adjustment information acquisition unit 55 is output to the adjustment-optical-system control unit 51, and the adjustment-optical-system control unit 51 adjusts the optical characteristics of the adjustment optical system 20 on the basis of the input adjustment information (S28).

The optical characteristics of the adjustment optical system 20 are adjusted as described above and thereby the effect of refraction due to a meniscus formed on the liquid surface of the culture liquid C is removed, and then, the first imaging region is irradiated again with phase-contrast-measurement illumination light (S30). Due to irradiation with the phase-contrast-measurement illumination light, the final phase contrast image of the first imaging region is captured by the imaging unit 40 (S32).

The phase contrast image is stored in a storage unit (not shown), which is composed of a memory and the like, of the microscope control device 50.

Next, the stage driving unit 62 moves the stage 61 in the X direction and the Y direction, and thereby the imaging region moves. For each imaging region, in the same way as described above, autofocus control, estimation of the liquid surface shape, adjustment of the adjustment optical system 20, and capturing of a phase contrast image are performed. The phase contrast images of the imaging regions are successively stored in the storage unit of the microscope control device 50.

The microscope control device 50 generates a composite phase contrast image of one entire well by combining the phase contrast images of the imaging regions, and the composite phase contrast image is displayed on the display device 70 (S34).

With the microscope system according to the embodiment, the liquid surface in the culture vessel 60, containing a culture liquid C and a specimen S, is irradiated with liquid-surface-measurement illumination light and transmitted light that has passed through the culture liquid C in the culture vessel 60 due to irradiation with the liquid-surface-measurement illumination light is detected by the imaging unit 40. Moreover, the relative positional relationship between the focal plane of the image forming optical system 30 and the culture vessel 60 is changed and a detection signal of transmitted light for each position of the focal plane is acquired, and the liquid surface shape of the liquid is estimated on the basis of the detection signal of transmitted light for each position of the focal plane. Therefore, it is possible to accurately recognize the shape of the meniscus formed on the liquid surface of the culture liquid C contained in the culture vessel 60.

Adjustment information for adjusting the optical characteristics of the adjustment optical system 20, which adjusts refraction of light due to a liquid surface shape, is acquired on the basis of the estimated liquid surface shape; the optical characteristics of the adjustment optical system 20 are adjusted on the basis of the adjustment information; the culture vessel 60 is irradiated with phase-contrast-measurement illumination light; and an image of the specimen irradiated with the phase-contrast-measurement illumination light is captured. Therefore, it is possible to remove the effect of refraction of the phase-contrast-measurement illumination light due to the meniscus with high precision and to acquire a more appropriate phase contrast image.

In the microscope system according to the embodiment, the relative positional relationship between the focal plane of the image forming optical system 30 and the culture vessel 60 is changed by moving the objective lens 31 in the Z direction. However, this is not a limitation. The relative positional relationship between the focal plane of the image forming optical system 30 and the culture vessel 60 may be changed by moving the culture vessel 60 in the Z direction by moving the stage 61 in the Z direction.

In the microscope system according to the embodiment, nine irradiation points in the imaging regions are irradiated with liquid-surface-measurement illumination light. However, the number of irradiation points is not limited to this. For example, at least one irradiation point in the imaging region may be irradiated with liquid-surface-measurement illumination light, and the liquid surface shape may be estimated on the basis of position information of the imaging region including the irradiation point (corresponding to position information about an irradiation point of the liquid-surface-measurement illumination light in the present invention), a detection signal of transmitted light, and information representing a preset curve of the liquid surface. To be specific, for example, the center of gravity position in the imaging region may be irradiated with liquid-surface-measurement illumination light, information L about the liquid level at the center of gravity position may be acquired by acquiring a displacement amount of the imaging position of transmitted light by changing the position of the focal plane of the image forming optical system 30 as described above, the information L about the liquid level may be set at the peak of a preset curve of the liquid surface, and thereby the shape of the entirety of the liquid surface may be estimated. Examples of information representing a preset curve of the liquid surface include a function representing the curve. Preferably, the information representing the curve of the liquid surface is changed in accordance with the position information of an imaging region including an irradiation point.

Figure 10:
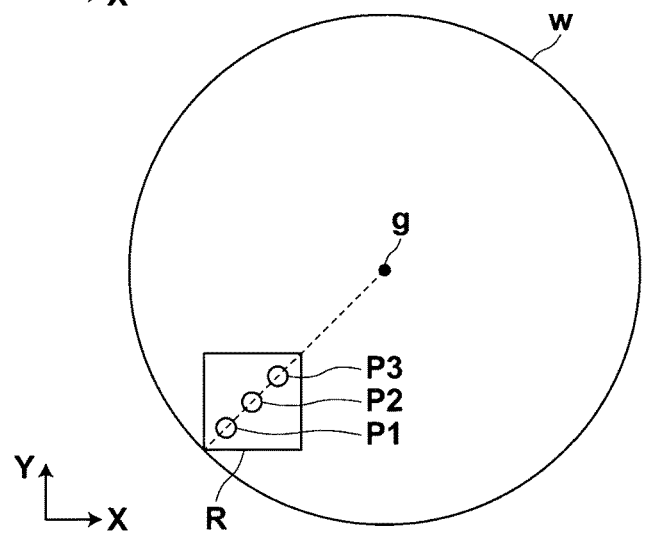
FIG. 10 illustrates a case where a liquid surface shape is estimated by irradiating three irradiation points in an imaging region with liquid-surface-measurement illumination light.

As illustrated in FIG. 10, at least three irradiation points in an imaging region R may be irradiated with liquid-surface-measurement illumination light, and the liquid surface shape may be estimated on the basis of position information of the imaging region including the irradiation points and a detection signal of transmitted light. To be specific, for example, as illustrated in FIG. 10, three irradiation points are set in the imaging region on a straight line extending from the center of gravity position of a well w (liquid surface) toward an outer periphery of the well, and the three irradiation points are irradiated with liquid-surface-measurement illumination light. In this case, it is possible to increase the precision of estimating the liquid surface shape by arranging the three irradiation points at regular intervals.

For each irradiation point, as described above, information L about the liquid level at the irradiation point is acquired by changing the position of the focal plane of the image forming optical system 30 and acquiring a displacement amount of the imaging position of transmitted light. Because the curved surface of a meniscus formed on the liquid surface has a point-symmetrical shape with respect to the center g of the well, it is possible to estimate the shape of the liquid surface in the imaging region R by rotating a curved line obtained by connecting information L about the liquid level corresponding to the three irradiation points. Preferably, the method of obtaining the curved line is changed in accordance with the position information of the imaging region including the irradiation points.

If information such as a function representing a curve of the liquid surface has been preset, the shape of the liquid surface may be estimated by fitting information L about the liquid level corresponding to the three irradiation points to the function. In this case, position information of the imaging region including the irradiation points is not necessary.

Figure 11:
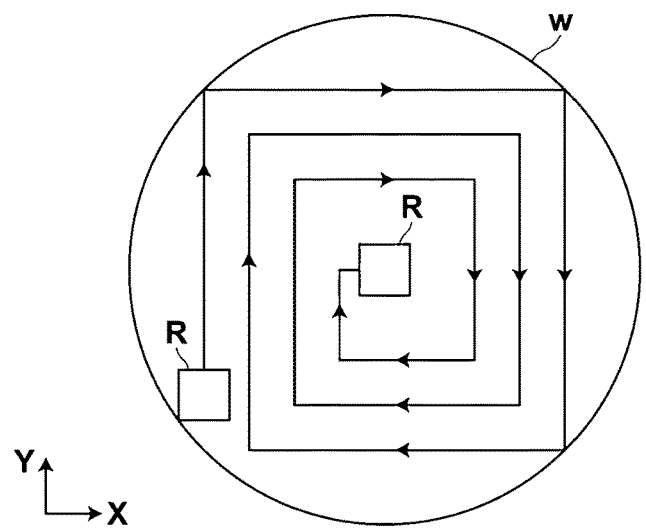
FIG. 11 illustrates a method of forming a phase contrast image by changing the imaging region spirally.

As illustrated in FIG. 11, when capturing phase contrast images of imaging regions while changing the imaging regions R spirally from the outer periphery toward the center of one well w, the liquid surface may be estimated only once for one imaging region on each of circumferences at different distances from the center of gravity position of the well w (liquid surface).

In the microscope system according to the embodiment described above, nine irradiation points are irradiated with liquid-surface-measurement illumination light at timings that differ between the points. However, the nine irradiation points may be simultaneously irradiated with liquid-surface-measurement illumination light. In this case, in order to easily establish correspondence between the image-forming positions of transmitted light before and after changing the position of the focal plane of the image forming optical system 30 for each irradiation point, the irradiation points may be irradiated with liquid-surface-measurement illumination light having shape patterns that differ between the irradiation points. Then, for each irradiation point, a displacement amount of the imaging position of transmitted light may be acquired by establishing correspondence between the images of transmitted light having the same shape pattern.

In order to easily establish correspondence between image-forming positions of transmitted light before and after changing the position of the focal plane of the image forming optical system 30 for each irradiation point, the irradiation points may be irradiated with liquid-surface-measurement illumination light having colors (wavelengths) that differ between the irradiation points. Then, the displacement amount of the imaging position of transmitted light may be acquired by establishing correspondence between the images of transmitted light having the same color for each irradiation point. In this case, an imaging element having a color filter is used as the imaging element of the imaging unit 40.

When performing so-called "time-lapse imaging", in which image-capturing is performed a plurality of times over time, by using the microscope system according to the embodiment, it is considered that the amount, the viscosity, and the like of the culture liquid C may change with time and the shape of the meniscus may change. Accordingly, it is preferable that a liquid surface shape may be estimated as described above each time a phase contrast image is captured and the optical characteristics of the adjustment optical system 20 be adjusted on the basis of the estimation result. When estimating the liquid surface shape a plurality of times over time in this way, the number of irradiation points of liquid-surface-measurement illumination light that are set when estimating the liquid surface shape this time may be reduced by using previous results of estimating the liquid surface shape.

To be specific, the previous results of estimating the liquid surface shape are stored in the liquid-surface-shape estimating unit 54, and this time, irradiation points that are fewer than the irradiation points that were set when a liquid surface shape was estimated previously are set. Then, information L on the liquid level on the liquid surface for each irradiation point is acquired by irradiating the irradiation points with liquid-surface-measurement illumination light, and the result of estimating the liquid surface shape this time may be acquired by fitting the liquid surface shape estimated previously to the information L about the liquid level obtained this time.

In the microscope system according to the embodiment, irradiation with laser light, which is spotlight, as liquid-surface-measurement illumination light is performed. However, this is not a limitation. Irradiation with pattern light having a preset pattern may be performed as irradiation with liquid-surface-measurement illumination light.

Figure 12:
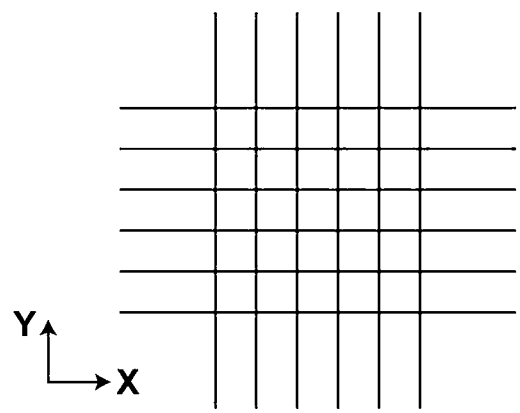
FIG. 12 illustrates an example of liquid-surface-measurement illumination light having a grid pattern.

To be specific, irradiation with liquid-surface-measurement illumination light having a grid pattern shown in FIG. 12 may be performed. In this case, the intersections of the grid may be used as the irradiation points described above, the displacement amounts between the imaging positions of the intersections before and after changing the position of the focal plane of the image forming optical system 30 may be acquired, and information L about the liquid levels at positions on the liquid surface corresponding to the positions of the intersections may be acquired on the basis of the displacement amounts.

When performing irradiation with liquid-surface-measurement illumination light having a grid pattern as illustrated in FIG. 12, in order to easily establish correspondence between image forming positions of the intersections before and after changing the position of the focal plane of the image forming optical system 30, patterns of marks that form images having different shapes may be formed at the intersections of the grid-shaped pattern light. Examples of the patterns of marks include a star-shaped pattern and a circular pattern. Alternatively, the colors (wavelengths) at the intersections of the grid-shaped pattern light may differ from each other.

Figure 13:
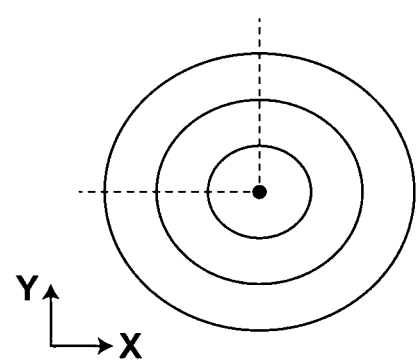
FIG. 13 illustrates an example of liquid-surface-measurement illumination light having a concentric pattern.

The pattern of liquid-surface-measurement illumination light having a pattern is not limited to a grid pattern. As illustrated in FIG. 13, irradiation with liquid-surface-measurement illumination light having a concentric pattern may be performed. In this case, intersections of concentric circles and straight lines extending in the X direction and the Y direction may be used as the irradiation points described above, the displacement amounts between the imaging positions of the intersections before and after changing the position of the focal plane of the image forming optical system 30 may be acquired, and information L about the liquid levels at positions on the liquid surface corresponding to the positions of the intersections may be acquired on the basis of the displacement amount.

Also when performing irradiation with liquid-surface-measurement illumination light having a concentric pattern, in order to easily establish correspondence between the image forming positions of the intersections before and after changing the position of the focal plane of the image forming optical system 30, patterns of marks that form images having different shapes may be formed at the intersections of the concentric pattern light. Alternatively, the colors (wavelengths) at the intersections of the concentric pattern light may differ from each other.

Figure 14:
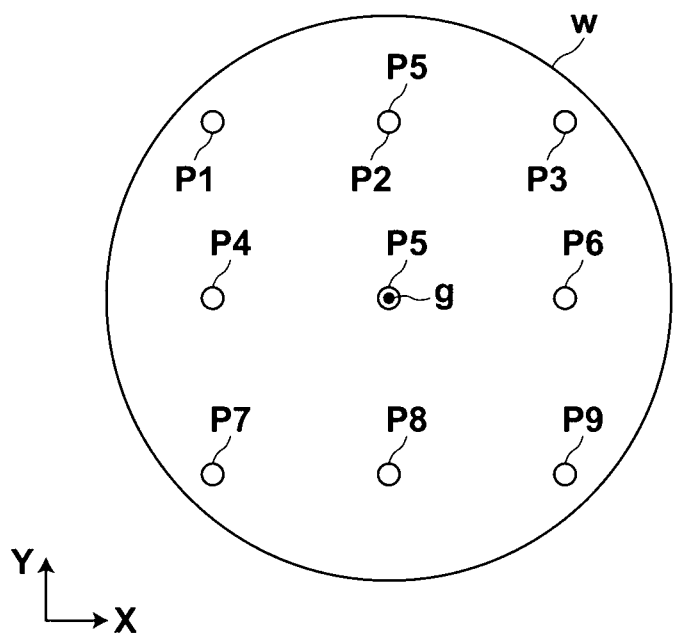
FIG. 14 illustrates a case where nine irradiation points, to be irradiate with liquid-surface-measurement illumination light, are set in the entirety of a well and the liquid surface shape of the entirety of the well is estimated.

In the microscope system according to the embodiment, a liquid surface shape is estimated for each of the imaging regions. However, this is not a limitation. For example, as illustrated in FIG. 14, at least nine irradiation points of liquid-surface-measurement illumination light may be evenly set in one well w, information L about the liquid level at each of the irradiation points may be acquired, and the liquid surface shape of the entirety of the well w may be estimated on the basis of the information about the liquid level.

Figure 15:
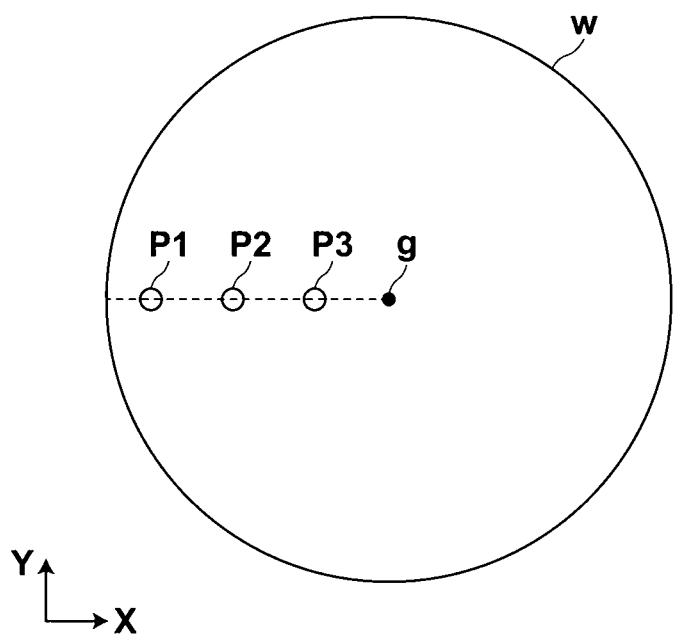
FIG. 15 illustrates a case where three irradiation points, to be irradiated with liquid-surface-measurement illumination light, are set in the entirety of a well and the liquid surface shape of the entirety of the well is estimated.

As illustrated in FIG. 15, three irradiation points may be set at regular intervals on a straight light extending from the center of gravity position of a well w toward an outer periphery, information L about the liquid level at each irradiation point may be acquired on the basis of the detection signal of transmitted light, and the liquid surface shape in the entirety of the well may be estimated by rotating a curved line obtained by connecting the information L about the liquid level corresponding to the irradiation points by 360 degrees.

When estimating the liquid surface shape of the entirety of a well w as described above, the refraction angle θ may be obtained for each imaging region in the well w, and the optical characteristics of the adjustment optical system 20 may be adjusted on the basis of the refraction angle θ.

In the microscope system according to the embodiment, the adjustment optical element 21 is used to remove the effect of refraction of phase-contrast-measurement illumination light due to a meniscus formed on the liquid surface. However, it is not necessary to use the adjustment optical element 21. For example, the effect of refraction of phase-contrast-measurement illumination light due to a meniscus formed on the liquid surface may be removed by moving the slit plate 12 in the X direction and the Y direction or by moving the phase plate 32 in the X direction and the Y direction on the basis of adjustment information. That is, the slit plate 12 or the phase plate 32 may be used as an adjustment optical system in the present invention.

In the microscope system according to the embodiment, the adjustment optical element 21 is disposed between the condenser lens 13 and the culture vessel 60. However, the position of the adjustment optical element 21 is not limited to this position. For example, the adjustment optical element 21 may be disposed at another position, such as a position between the white light source 11 and the slit plate 12, a position between the phase plate 32 and the condenser lens 13, or a position between the culture vessel 60 and the objective lens 31.

REFERENCE SIGNS LIST 10 phase-contrast-measurement illumination-light irradiation unit
11 white light source
12 slit plate
12a slit
12b light screen
13 condenser lens
15 liquid-surface-measurement illumination-light irradiation unit
16 laser light source
17 dichroic mirror
20 adjustment optical system
21 adjustment optical element
22 adjustment-optical-system driving unit
30 image forming optical system
31 objective lens
32 phase plate
32a phase ring
32b transparent plate
33 image forming lens
34 image-forming-optical-system driving unit
40 imaging unit
50 microscope control device
51 adjustment-optical-system control unit
52 image-forming-optical-system control unit
53 stage control unit
54 liquid-surface-shape estimating unit
55 adjustment information acquisition unit
60 culture vessel
61 stage
62 stage driving unit
70 display device
80 input device

What is claimed is:

1. A phase-contrast microscope comprising:
a phase-contrast-measurement illumination-light irradiation unit that irradiates a vessel containing a liquid and a specimen with phase-contrast-measurement illumination light for phase-contrast measurement;
an imaging unit that captures an image of the specimen irradiated with the phase-contrast-measurement illumination light;
a liquid-surface-measurement illumination-light irradiation unit that irradiates a liquid surface of the liquid with liquid-surface-measurement illumination light for measuring a liquid surface shape of the liquid in the vessel;
a transmitted light detection unit that detects transmitted light that has passed through the liquid surface of the liquid in the vessel due to irradiation with the liquid-surface-measurement illumination light;
a focal plane changing unit that changes a relative positional relationship between a focal plane of an image forming optical system and the vessel, the image forming optical system focusing the transmitted light on a detection surface of the transmitted light detection unit;
a liquid-surface-shape estimating unit that estimates the liquid surface shape of the liquid on the basis of a detection signal of the transmitted light for each relative position of the focal plane and the vessel;
an adjustment optical system whose optical characteristics are adjustable and that adjusts refraction of the phase-contrast-measurement illumination light due to the liquid surface shape of the liquid in the vessel in accordance with the optical characteristics; and
an adjustment information acquisition unit that acquires adjustment information for adjusting the optical characteristics of the adjustment optical system on the basis of the liquid surface shape estimated by the liquid-surface-shape estimating unit.

2. The phase-contrast microscope according to claim 1 further comprising:
an adjustment-optical-system control unit that adjusts the optical characteristics of the adjustment optical system on the basis of the adjustment information acquired by the adjustment information acquisition unit.

3. The phase-contrast microscope according to claim 1, wherein the focal plane changing unit changes the relative positional relationship between the focal plane and the vessel by moving an optical element included in the image forming optical system in an optical axis direction.

4. The phase-contrast microscope according to claim 1, wherein the focal plane changing unit changes the relative positional relationship between the focal plane and the vessel by moving the vessel in an optical axis direction of the image forming optical system.

5. The phase-contrast microscope according to claim 1, wherein the focal plane changing unit changes the relative positional relationship between the focal plane and the vessel by switching between a plurality of optical elements that are provided in the image forming optical system and that have different focal lengths.

6. The phase-contrast microscope according to claim 1, wherein the liquid-surface-shape estimating unit estimates the liquid surface shape on the basis of information about an irradiation position of the liquid-surface-measurement illumination light on the liquid surface of the liquid, information representing a preset curve of the liquid surface, and a detection signal of the transmitted light in a case where at least one point on the liquid surface of the liquid is irradiated with the liquid-surface-measurement illumination light.

7. The phase-contrast microscope according to claim 1, wherein the liquid-surface-shape estimating unit estimates the liquid surface shape on the basis of at least one of information about an irradiation position of the liquid-surface-measurement illumination light on the liquid surface of the liquid or information representing a preset curve of the liquid surface, and a detection signal of the transmitted light in a case where at least three points on the liquid surface of the liquid are irradiated with the liquid-surface-measurement illumination light.

8. The phase-contrast microscope according to claim 1, wherein the liquid-surface-shape estimating unit estimates the liquid surface shape on the basis of a detection signal of the transmitted light in a case where at least nine points on the liquid surface of the liquid are irradiated with the liquid-surface-measurement illumination light.

9. The phase-contrast microscope according to claim 1, wherein the liquid-surface-shape estimating unit estimates the liquid surface shape only once for each of circumferences at different distances from a center of gravity position of the liquid surface of the liquid.

10. The phase-contrast microscope according to claim 1, wherein, when the liquid-surface-measurement illumination-light irradiation unit irradiates a plurality of points on the liquid surface of the liquid with the liquid-surface-measurement illumination light, the liquid-surface-measurement illumination-light irradiation unit irradiates the points with the liquid-surface-measurement illumination light having shape patterns that differ between the points.

11. The phase-contrast microscope according claim 1, wherein, when the liquid-surface-measurement illumination-light irradiation unit irradiates a plurality of points on the liquid surface of the liquid with the liquid-surface-measurement illumination light, the liquid-surface-measurement illumination-light irradiation unit irradiates the points with the liquid-surface-measurement illumination light at timings that differ between the points.

12. The phase-contrast microscope according to claim 1, wherein, when the liquid-surface-measurement illumination-light irradiation unit irradiates a plurality of points on the liquid surface of the liquid with the liquid-surface-measurement illumination light, the liquid-surface-measurement illumination-light irradiation unit irradiates the points with the liquid-surface-measurement illumination light having wavelengths that differ between the points.

13. The phase-contrast microscope according to claim 1, wherein the liquid-surface-shape estimating unit estimates a liquid surface shape at a point on the liquid surface that is not irradiated with the liquid-surface-measurement illumination light by performing interpolation by using a result of estimating a liquid surface shape at a point on the liquid surface that is irradiated with the liquid-surface-measurement illumination light.

14. The phase-contrast microscope according to claim 1, wherein the liquid-surface-shape estimating unit stores a result of estimating the liquid surface shape, and
when the liquid-surface-shape estimating unit estimates a liquid surface shape of the liquid surface again at a later time after the estimation result has been stored by the liquid-surface-shape estimating unit,
the liquid-surface-measurement illumination-light irradiation unit reduces the number of irradiation points of the liquid-surface-measurement illumination light on the liquid surface compared with a case where the liquid surface shape is estimated at an earlier time before the estimation result is stored, and
the liquid-surface-shape estimating unit estimates a liquid surface shape at the later time on the basis of the result of estimating the liquid surface based on a detection signal of the transmitted light at the irradiation points that have been reduced in number and the stored result of estimating the liquid surface shape.

15. The phase-contrast microscope according to claim 1, wherein the liquid-surface-measurement illumination-light irradiation unit irradiates the liquid surface of the liquid with pattern light having a preset pattern as the liquid-surface-measurement illumination light.

16. The phase-contrast microscope according to claim 15, wherein the pattern light has a grid pattern.

17. The phase-contrast microscope according to claim 15, wherein the pattern light has a concentric pattern.

18. The phase-contrast microscope according to claim 15, wherein images having different shapes are formed at a plurality of preset positions on an image formed by the pattern light.

19. The phase-contrast microscope according to claim 15, wherein images having different colors are formed at a plurality of preset positions on an image formed by the pattern light.

20. The phase-contrast microscope according to claim 1, wherein the adjustment information acquisition unit calculates an optical path displacement of the phase-contrast-measurement illumination light due to the liquid surface shape of the liquid on the basis of the estimated liquid surface shape and acquires the adjustment information of the adjustment optical system on the basis of the calculated optical path displacement.

21. The phase-contrast microscope according to claim 1, wherein the liquid-surface-shape estimating unit estimates the liquid surface shape by calculating curved surface information and position information of the liquid surface.

22. An imaging method comprising:
irradiating a liquid surface of a liquid in a vessel containing the liquid and a specimen with liquid-surface-measurement illumination light for measuring a liquid surface shape of the liquid in the vessel;
detecting transmitted light that has passed through the liquid surface of the liquid in the vessel due to irradiation with the liquid-surface-measurement illumination light by using a transmitted light detection unit;
changing a relative positional relationship between a focal plane of an image forming optical system and the vessel, the image forming optical system focusing the transmitted light on a detection surface of the transmitted light detection unit, and acquiring a detection signal of the transmitted light for each relative position of the focal plane and the vessel;
estimating the liquid surface shape of the liquid on the basis of the detection signal of the transmitted light for each relative position of the focal plane and the vessel;
acquiring adjustment information for adjusting optical characteristics of an adjustment optical system that adjusts refraction of light due to the liquid surface shape on the basis of the estimated liquid surface shape;
adjusting the optical characteristics of the adjustment optical system on the basis of the adjustment information;
irradiating the vessel with phase-contrast-measurement illumination light for phase-contrast measurement after adjusting the optical characteristics of the adjustment optical system; and
capturing an image of the specimen irradiated with the phase-contrast-measurement illumination light.

* * * * *